Figure 1:
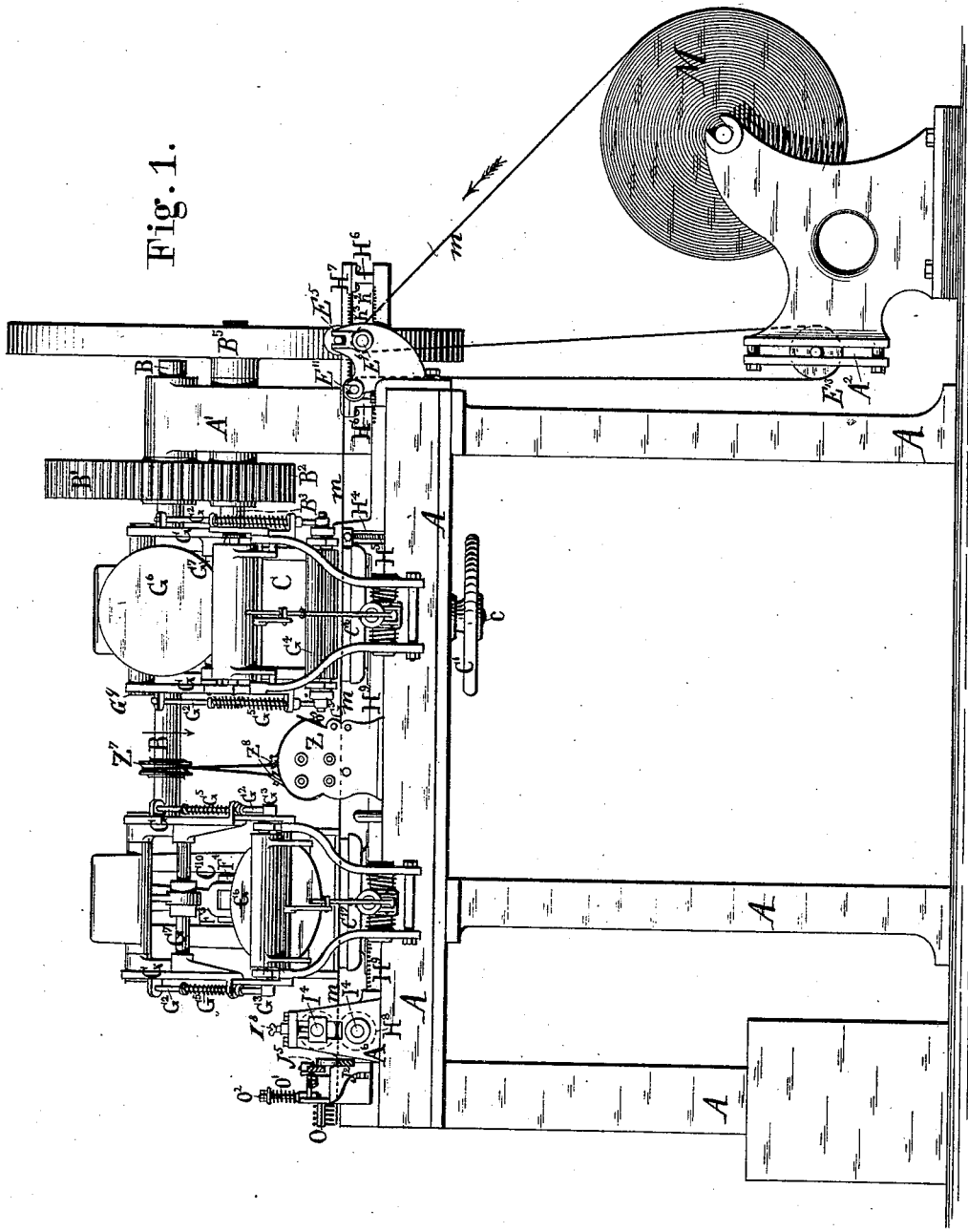

(No Model.) 8 Sheets—Sheet 1.

T. A. BRIGGS.
LABEL MACHINE.

No. 262,566. Patented Aug. 15, 1882.

WITNESSES. INVENTOR.

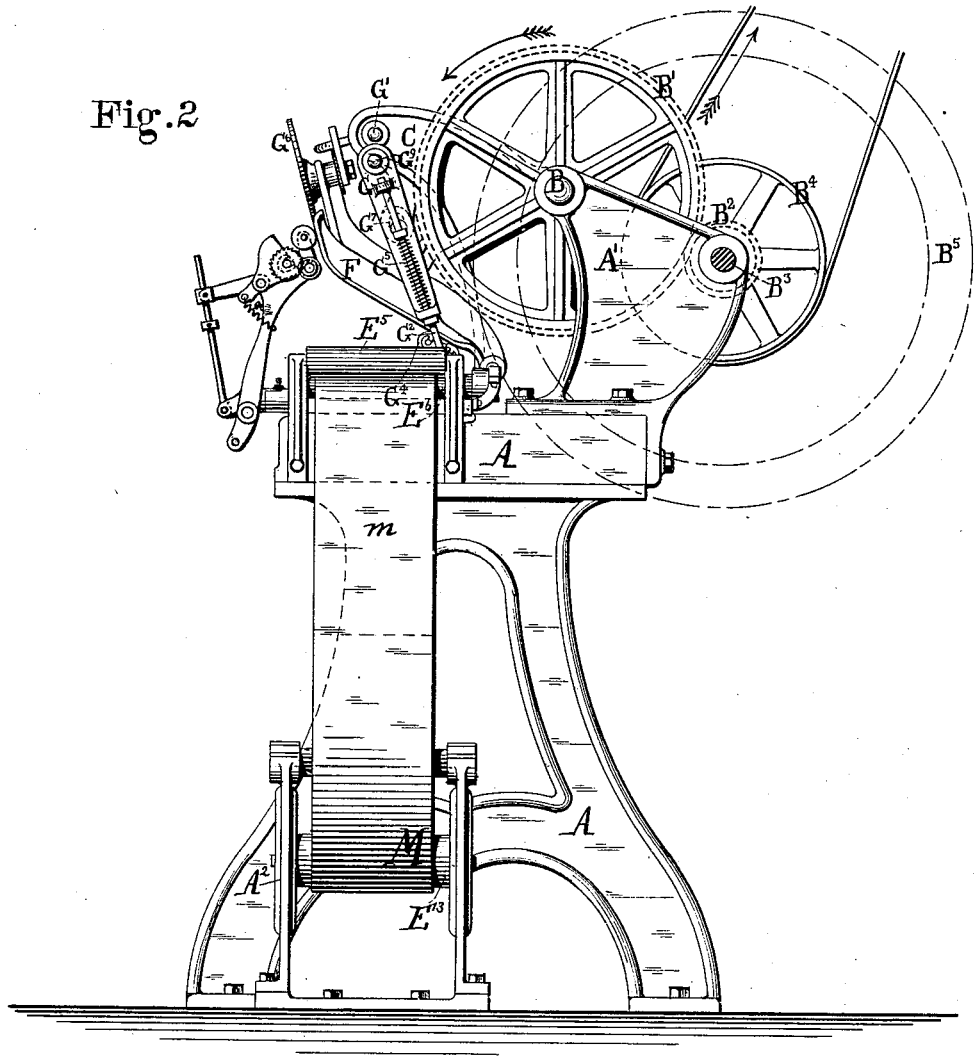

(No Model.)  T. A. BRIGGS.  8 Sheets—Sheet 3.
LABEL MACHINE.
No. 262,566.  Patented Aug. 15, 1882.
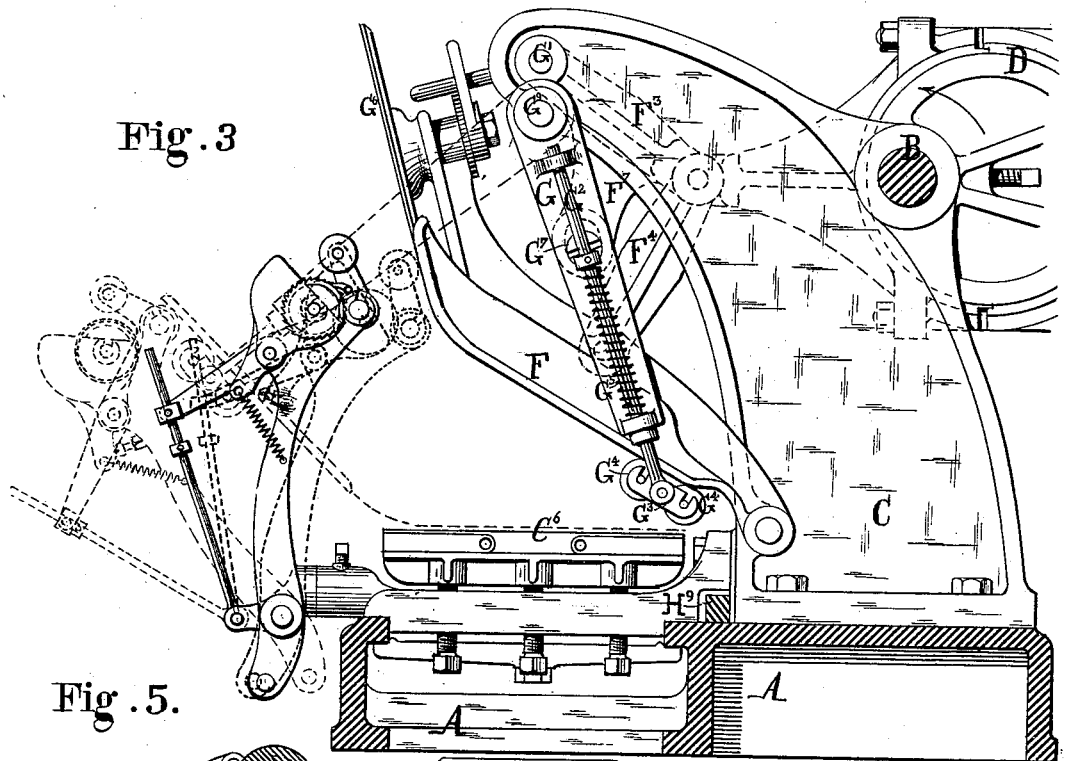
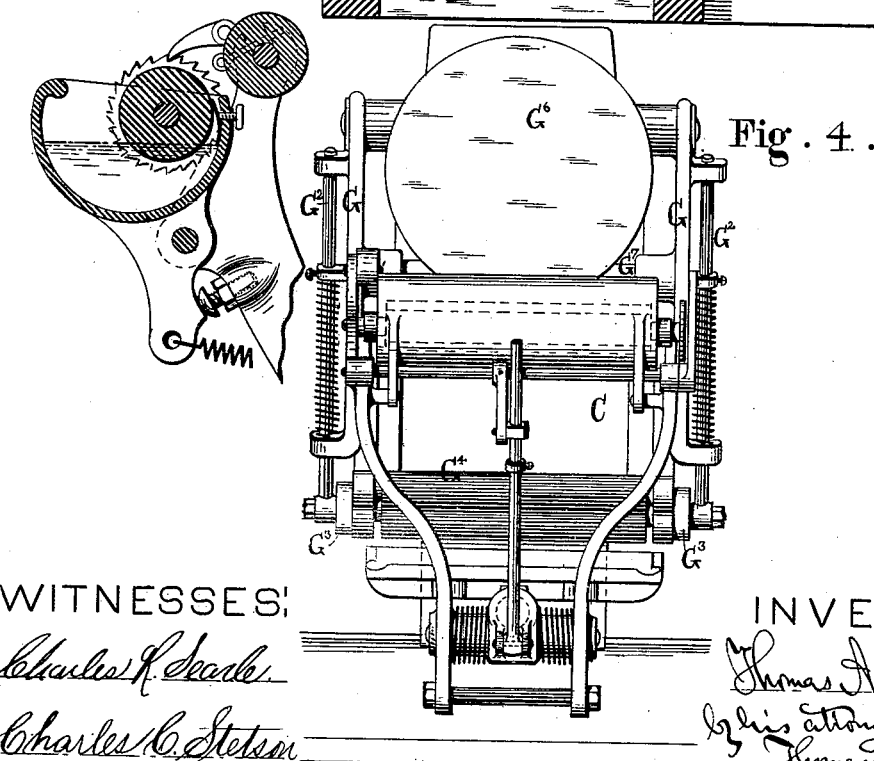
WITNESSES:
Charles R. Searle
Charles C. Stetson
INVENTOR,
Thomas A. Briggs
by his attorney
Thomas J. Stetson (No Model.)  T. A. BRIGGS.  8 Sheets—Sheet 4.
LABEL MACHINE.
No. 262,566.  Patented Aug. 15, 1882.
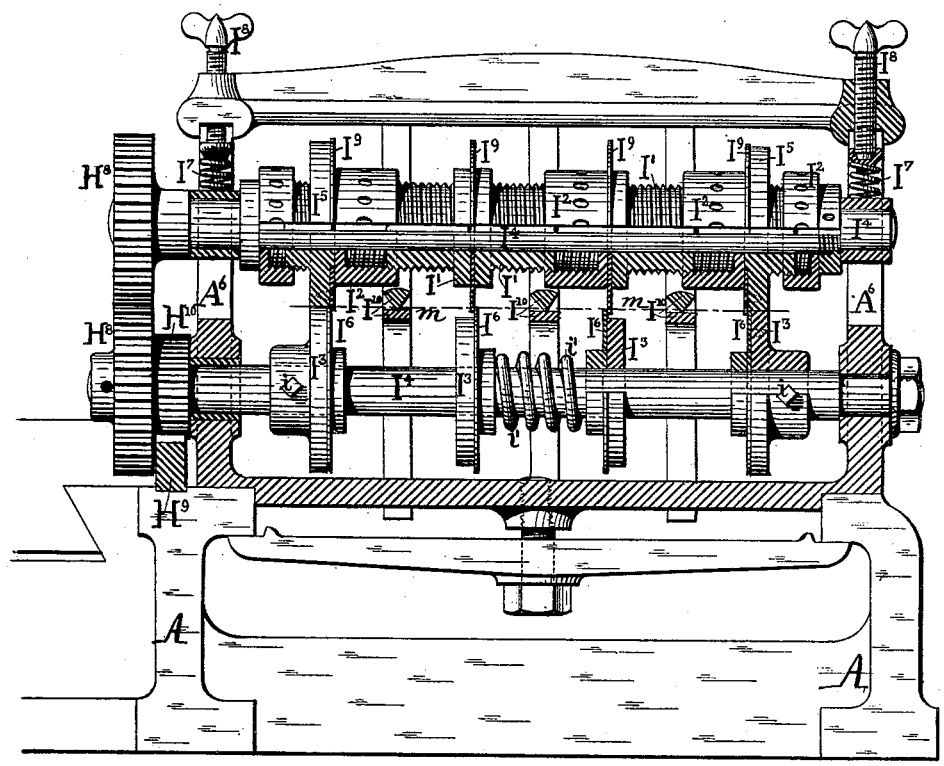
FIG. 6.
WITNESSES:  INVENTOR:

(No Model.) 8 Sheets—Sheet 5.
T. A. BRIGGS.
LABEL MACHINE.
No. 262,566. Patented Aug. 15, 1882.
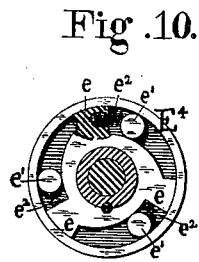
Fig. 10.
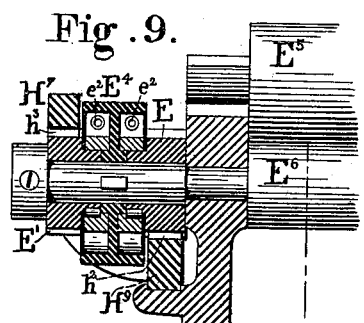
Fig. 9.
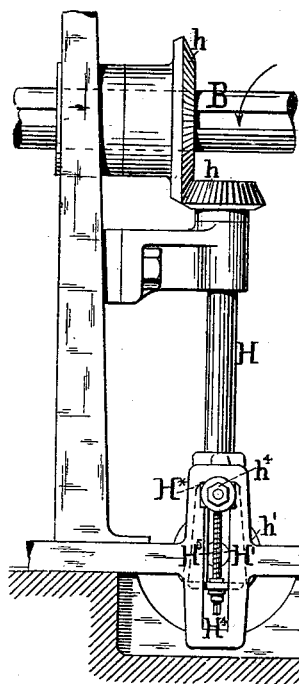
Fig. 8.
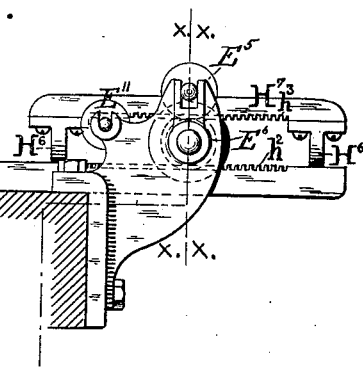
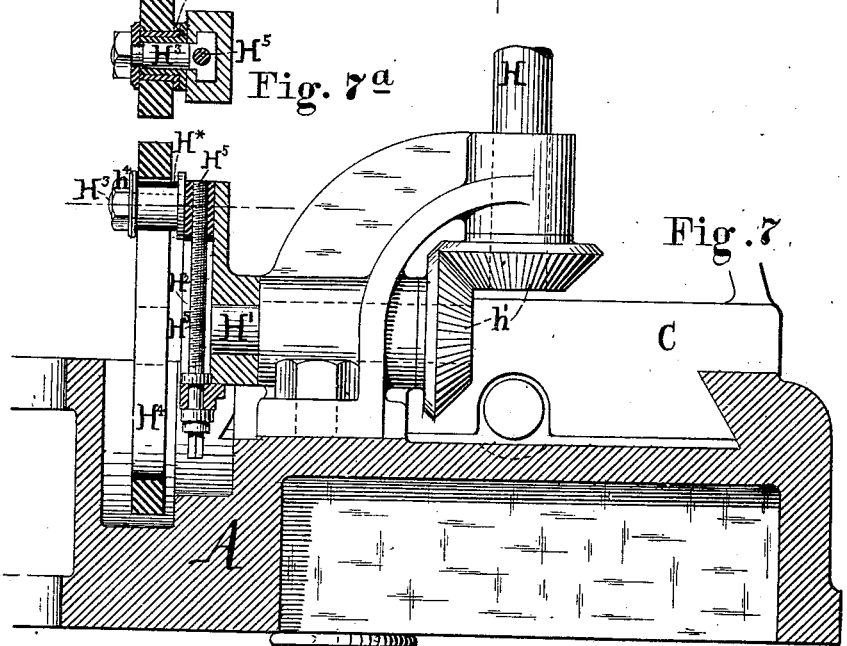
Fig. 7ᵃ
Fig. 7.
WITNESSES:
Charles R. Searle
Charles C. Stetson
INVENTOR:
Thomas A. Briggs
by his attorney T. A. Stetson (No Model.) 8 Sheets—Sheet 6.
T. A. BRIGGS.
LABEL MACHINE.
No. 262,566. Patented Aug. 15, 1882.
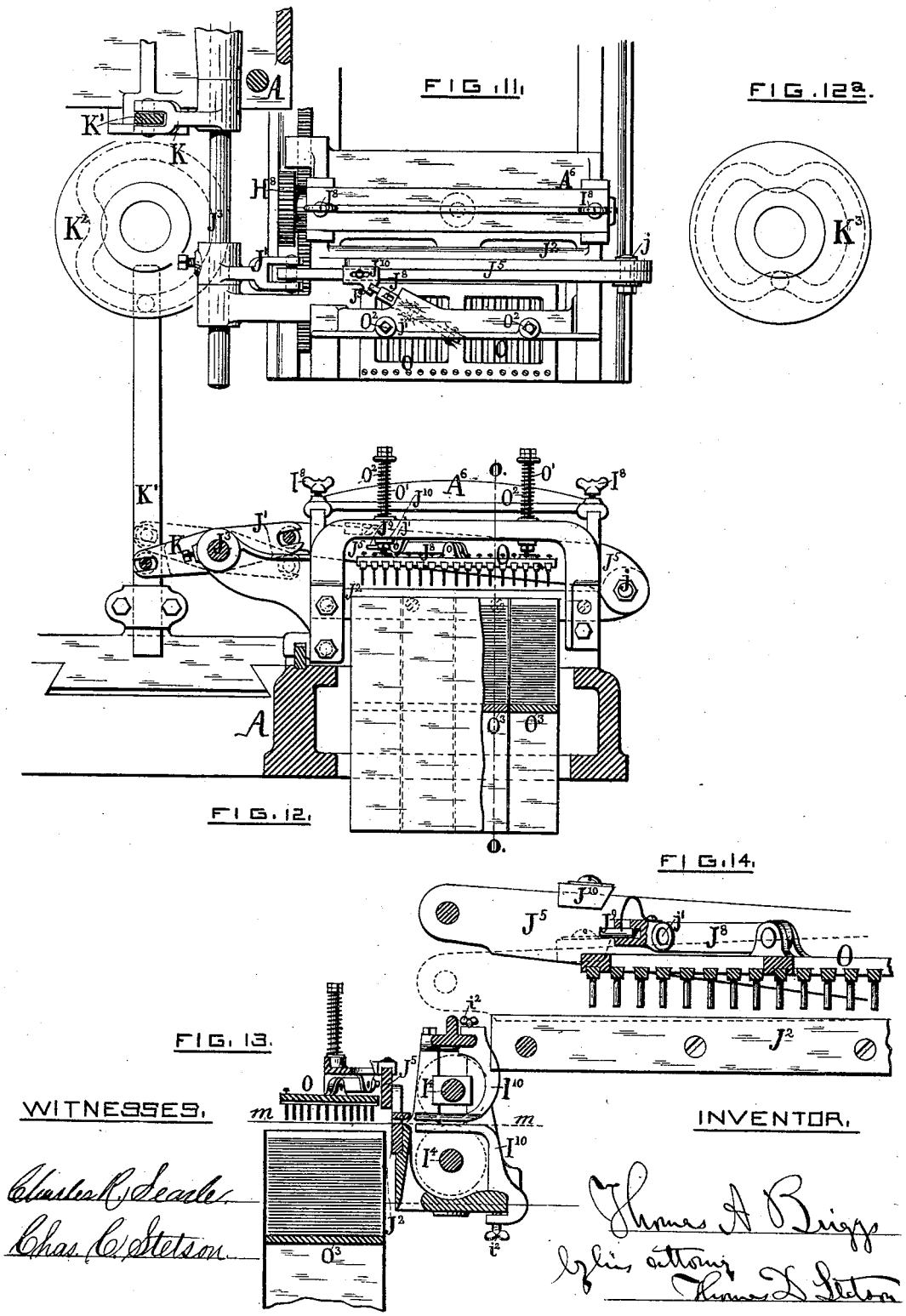
WITNESSES. INVENTOR.

(No Model.) 8 Sheets—Sheet 7.
T. A. BRIGGS.
LABEL MACHINE.
No. 262,566. Patented Aug. 15, 1882.
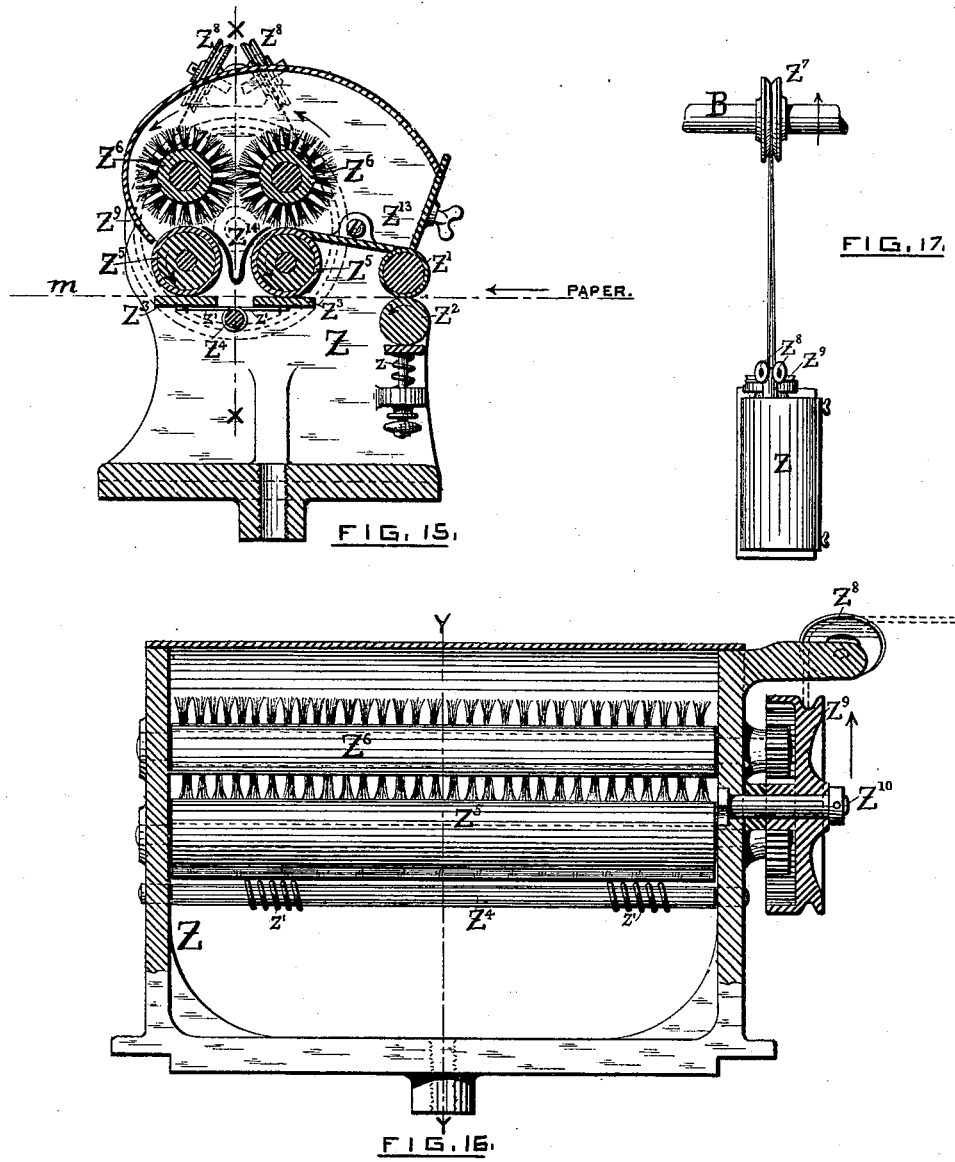
WITNESSES.
Charles R. Searle
Charles C. Stetson
INVENTOR.
Thomas A. Briggs
by his attorney
Thomas L. Stetson (No Model.) 8 Sheets—Sheet 8.
T. A. BRIGGS.
LABEL MACHINE.
No. 262,566. Patented Aug. 15, 1882.
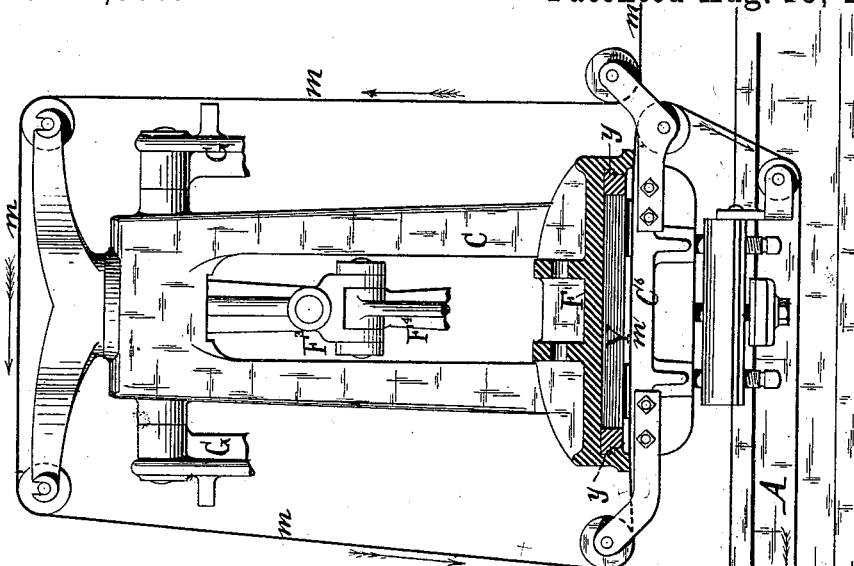
Fig. 18.
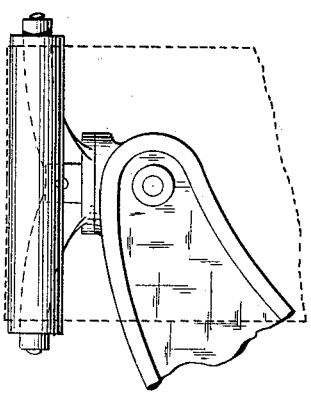
Fig. 19.
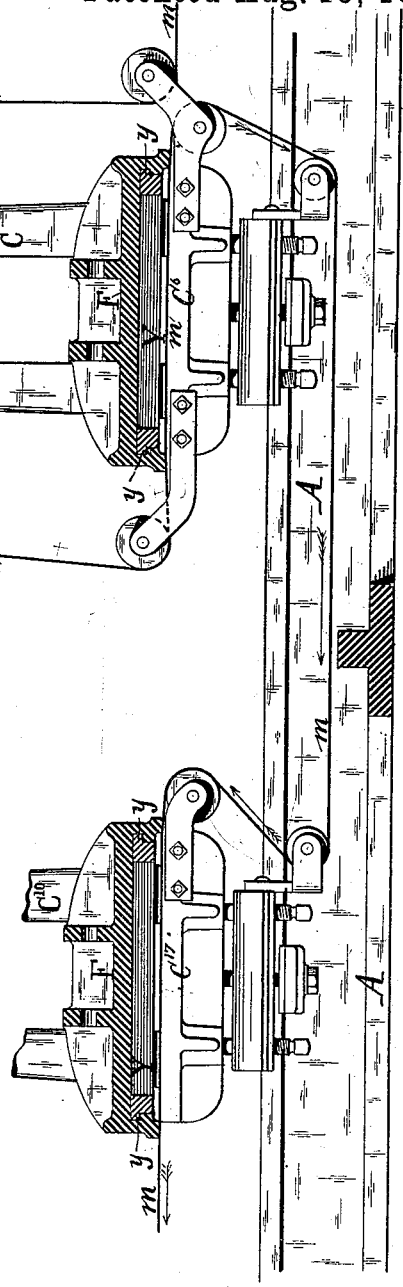
WITNESSES:
Charles H. Searle.
Charles C. Stetson.
INVENTOR:
Thomas A. Briggs
by his attorney C. A. Stetson

UNITED STATES PATENT OFFICE.

THOMAS A. BRIGGS, OF PROVIDENCE, RHODE ISLAND, ASSIGNOR TO HIMSELF, JOHN B. PERKINS, OF TAUNTON, MASSACHUSETTS, AND FRED TALCOTT, OF ROCKVILLE, CONNECTICUT.

LABEL-MACHINE.

SPECIFICATION forming part of Letters Patent No. 262,566, dated August 15, 1882.

Application filed October 6, 1881. (No model.)

*To all whom it may concern:*

Be it known that I, THOMAS A. BRIGGS, of Providence, in the county of Providence and State of Rhode Island, have invented certain new and useful Improvements in Label-Machines, by which I mean machines for printing and cutting labels and stamped work; and I do hereby declare that the following is a full and exact description thereof.
I will describe the invention as applied to the printing of small labels of paper. It will be understood that the invention may be also applied to the production of tags and analogous articles of various other materials—as card-board, linen, &c.

The improved machine is of that class in which the material is supplied from a roll mounted in suitable bearings, and is fed forward through the machine step by step, being printed on the way, and ultimately cut into small rectangular pieces, first, by being split by revolving shears into as many separate strips as the work requires, and then divided transversely by the momentary closing of suitable cross-shears.

I arrange two printing mechanisms to act at different points on the same strip of paper. They may be used to print two colors, or both may use the same color and have the same matter in type or electrotype therefor, printing the same label. When both printing mechanisms are used with the same color the feeding and cutting devices are adjusted to the increased work, producing double the quantity.
This mode of operation allows me to work the printing mechanisms deliberately and take ample time for the inking, distribution, &c., and yet produce a large quantity of work. I employ levers, which move the ink-rollers over the form, and operate such levers from the toggle-levers which produce the impression, and have devised and applied means for giving a longer traverse than would be otherwise practicable. I take hold of the strip of paper by two feeding mechanisms at two widely-separated points; but I operate both by the same adjustable mechanism, so that I can by a simple and single operation adjust both feeds with great nicety. I provide unusual facili-
ties for changing the position of the rotary cutters and very firmly holding them to vary the width of the strips to be cut. I introduce a bronzing mechanism, to be used when required. I pack the printed labels squarely and exactly by a mechanism which takes hold immediately after the transverse cutting operation. I lock the type or other device from which the labels are to be printed in a chase provided with wedge-formed surfaces. The inverted bed holding the chase is formed with corresponding side grooves, and the chase is secured by being simply thrust into the machine in its proper position. The weight of the form and chase is supported by the wedge-formed grooves.

The following is a description of what I consider the best means of carrying out the invention.

The accompanying drawings form a part of this specification.

Figure 1 is a side elevation of the machine. Fig. 2 is an end elevation. These figures show the entire machine on a small scale. The remaining figures show portions on a larger scale. Fig. 3 shows the first printing mechanism with a transverse section of the main driving-shaft and main frame. Fig. 4 is a front view of the same printing mechanism. Fig. 5 is a transverse section through the fountain-roll and the adjacent parts on a still larger scale. Fig. 6 is a vertical section through the longitudinal shearing or slitting mechanism, which is adapted to also serve as the second and intermittent feeding device. Figs. 7, 7$^a$, 8, 9, and 10 are details of the machinery for imparting motion to the feeding mechanism and for adjusting the extent thereof. Fig. 7 is a section through a portion on a plane transverse to the main frame. Fig. 8 is a section at right angles thereto. This view is on a smaller scale than Fig. 7. Fig. 9 is a section through another portion in a plane transverse to the main frame. Fig. 10 shows the provisions for engaging certain wheels shown in Fig. 9. Figs. 11 to 14, inclusive, show the mechanism for transverse shearing and packing the labels. Fig. 11 is plan view, partly in section. Fig. 12 is an end elevation, partly in section. Fig. 12$^a$ is a face view of the cam which is substituted when it is desired to cut off the paper twice for each revolution of the main shaft. Fig. 13 is a longitudinal section through certain portions. Fig. 14 is a transverse section through certain portions. The scale of Figs. 11, 12, 12$^a$, and 13 is alike. Fig. 14 is on a larger scale. Figs. 15, 16, and 17 represent the bronzing mechanism. Fig. 15 is a vertical section in a plane transverse to the axis of the rollers. Fig. 16 is a central vertical section in a plane parallel to the axis of the rollers. The scale of these two figures is alike. Fig. 17 is a plan view on a smaller scale. Figs. 18 and 19 represent a modification adapting the machine for printing on both sides of the paper or other material. Fig. 18 is a side elevation, partly in section. It shows the two platens and immediately adjacent parts, with that portion of the main frame upon which they are supported. Fig. 19 is a view of a portion at right angles to the view in Fig. 18.

Similar letters of reference indicate like parts in all the figures where they occur.

A is a fixed frame-work, of cast-iron or other suitable material, portions of which will be indicated, when necessary, by additional letters, as A′ A$^2$, &c.

The strip of paper $m$ is delivered from a roll, M, mounted in bearings with liberty to turn. It is led through the first pair of feed-rolls, E$^5$ E$^6$, which press it with sufficient force to give a reliable hold. It thence passes under a drop-roller, E$^{13}$, which is guided in vertical ways A$^2$. It thence passes up over a guide-roller, E$^{11}$, and thence over the bed C$^6$ of the first printing-machine, where it is printed with one set of impressions. It thence passes, if desired, through the bronzing mechanism, to be described farther on, and these impressions are bronzed. It thence passes over the bed C$^{17}$ of the second printing-machine, where it is subjected to the second set of impressions It thence passes between another pair of roller devices, where it is both gripped to aid in the feeding motion and also slit by revolving shears into two or more separate strips. It thence passes over the bed-knife J$^2$ and extends beyond the same to a certain distance, depending on the adjustment of the feeding devices. It stands in this position while a knife, J$^5$, descends with a quick movement and cuts off all the strips transversely. The rectangular pieces thus cut off are fully-completed and exactly-cut labels. These labels are now acted on by a device which descends and presses them with gentle force upon the piles of similar labels which have been previously printed and cut off. These piles rest on a yielding platform, which sinks as the material is successively added above, and from which the piles of completed and nicely-packed labels are removed at intervals by the attendant. The first printing mechanism can be adjusted backward and forward relatively to the line of travel of the strip of paper. This allows for adapting the machine to printing labels of different dimensions. The mechanism for cutting off the finished labels may be correspondingly set backward and forward. The several members of the machinery by which these several movements are effected are clearly shown in the drawings.

B$^3$ is the first shaft or driving-shaft, receiving power on a pulley, B$^4$, from a belt driven by a steam-engine or other suitable power. (Not represented.) This shaft carries a fly-wheel, B$^5$, and may be run quite rapidly. The pinion B$^2$ on this shaft gears into a large gear-wheel, B′, on the main shaft B, which latter is supported in a fixed bearing, A′, and in bearings in each of the printing mechanisms.

C is the framing of the first printing-machine. This is adjustable backward and forward on longitudinal ways, and is firmly clamped in any required position by the screw $c$, turned by the hand-wheel C′.

C$^{10}$ is the framing of the second printing-machine. This is bolted or otherwise secured firmly on the frame A.

Except that one is fixed and the other movable, the two printing mechanisms and their supporting-frames are alike. Both are operated from eccentrics D on the main shaft B, so arranged as to operate them alternately. Both are provided with mechanisms for inking and printing. (Clearly shown in Figs. 1, 2, 3, and 4.)

An important feature of this mechanism is in the provision for conveniently traversing the inking-rollers. There are two arms, G, mounted one on each side of the printing mechanism, and turning in planes transverse to the motion of the paper. These arms are rigidly connected by a bar, G$^7$. Each carries a sliding rod, G$^2$, which is provided at its lower end with a swivel and T-piece, G$^3$, affording bearings for two or more ink-rollers, G$^4$. These sliding rods, and consequently the ink-rollers, are forced upward by spiral springs G$^5$.

F$^3$ F$^4$ are the two parts of the toggle-lever which operates the bed F to produce the impression. From the upper part, F$^3$, of this toggle an arm, F$^7$, extends forward, having an elongated bearing or slot, which receives the bar G$^7$, and, as the toggle is operated to produce the impression, moves the arms G forward and moves the ink-rollers G$^4$ over the distributing-table G$^6$. On the contraction of the toggle the ink-rollers are moved in the opposite direction. I find that the motion is not sufficient when the axis of motion of the levers G is coincident with the upper center, G′, of the toggle. I obtain an increased motion by mounting the levers G on a separate axis, G$^9$, considerably lower. The exact relation of these centers is indicated in Fig. 3.

The chase Y (see Fig. 18) is provided with a wing or extension on the right and left sides, respectively, which, $y$, is thicker at the upper or front side than at the rear, and is accurately planed or otherwise finished. The under face of the inverted bed F is formed with a wing at each side having a corresponding wedge-shaped groove. All that is required to secure the chase and its contained form of types firmly in the proper position in the inverted bed is to slide the chase into the bed in the proper position so that its wings will enter the grooves, and as it is forced in will wedge tight. After its entrance has been arrested by the gradual tightening of the contact it is struck a few gentle blows with a mallet to force it in farther and tighter.

$A^6$ is the housing which carries the second feeding mechanism and the slitting-knives. These two functions are performed by parts mounted on a single pair of shafts, $I^4 I^4$, geared together by gear-wheels $H^8$. (See Fig. 6.) These shafts carry wheels $I^3 I^5$, which roll in contact, verged together by the springs $I^7$, adjusted by a thumb-screw $I^8$. These wheels take hold of the paper with sufficient firmness to constitute a reliable feed. Each wheel $I^3 I^5$ carries an annular knife, which, being properly adjusted to work with its mate, constitutes rotary shears, smoothly slitting the paper longitudinally. The lower shaft has these wheels $I^3$ held in position simply by pinching-screws $i$. This construction may be adopted for both rolls $I^3 I^5$, if preferred; but I have devised a different mode, and one which I esteem preferable, shown on the upper roll alone. It consists of a series of threaded thimbles or collars, alternately male and female, with provisions for engaging together, and for being turned by a suitable wrench. (Not represented.) The male collars are marked $I'$ and the female $I^2$.

The positions of the annular knives $I^6 I^9$ may be adjusted by turning the threaded collars $I' I^2$ relatively to each other. There should be a sufficient number of these collars of different lengths to adapt the invention to slit the paper into any number of strips or bands required. When the shafts are taken out of their bearings and the end nut removed these collars are readily removed and their places supplied by others of greater or less width. A turning of the collars $I'$ and $I^2$ relatively to each other may increase or diminish the width of any pair, so as to adjust the positions of the rotary cutters with great nicety. I can realize some of the advantages of the invention by adjusting the rotary cutters on both shafts by such collars; but I prefer for general practice to thus adjust on one shaft and to employ rotary cutters on the other shaft, differently mounted, so as to be self-adjusting. The non-feeding wheels $I^3$ on the lower shaft $I^4$ are thus operated. They are feathered on the shaft, so that they are compelled to turn therewith, but are free to move endwise thereon. They are pressed apart with sufficient force by the spiral spring $i'$ to insure a reliable contact of their edges with the edges of the firmly-set knives $I^6 I^9$, and constitute therewith efficient rotary shears.

Both feeds are operated by a single bar, $H^9$, reciprocating endwise in the frame A, and provided at one place with a long transverse slot, $H^4$. (See Fig. 8.) In this slot traverses a block inclosing a sleeve, $H^*$, fitted on a crank-pin, $H^3$, carried on a shaft, $H'$, which receives a continuous rotary motion through an upright shaft, H, and beveled-gear wheels $h\ h\ h'\ h'$ (see Figs. 7 and 8) from the main shaft B, as will be readily understood. The root or support of the crank-pin $H^3$ is T-shaped, and fits in a corresponding radial groove, $H^2$, in the crank, and is capable of being moved outward and inward, so as to increase or diminish the throw of the crank, and consequently to increase or diminish the extent of the reciprocation of the feed-bar $H^9$. The screw $H^5$, which, when the machine is stopped, may be turned by any suitable wrench, allows the position of this crank-pin $H^3$, and consequently the extent of the throw of the feed-bar $H^9$, to be adjusted with great nicety. The nut $h^4$ on the threaded end of the crank-pin $H^3$ is turned to set the parts rigidly when the proper adjustment is attained. Rigid arms $H^6$ connect this feed-bar with another rod, $H^7$, parallel therewith, near the end, at the right. This short parallel rod $H^7$ is on a higher level and at one side of the main bar $H^9$. The latter is fitted with accurately-cut teeth $h^2$ on its upper face, and the short parallel bar $H^7$ is correspondingly rack-formed on its lower face, as shown at $h^3$. The relation of these parts is clearly shown in Figs. 8 and 9.

The shaft of the lower roll, $E^6$, carries two gear-wheels, one of which, E, is engaged with the rack $h^2$ and the other, E', is engaged with the rack $h^3$. Both these gear-wheels are mounted loosely on the shaft of the feed-roll. The arrangement causes them to turn in opposite directions with each movement of the feed-bar $H^9$. Between them is a wheel, $E^4$, which is keyed fast to the shaft of the feed-roll $E^6$. Both faces of this wheel $E^4$ are deeply recessed, as indicated in Figs. 9 and 10. The wheels E and E' have peculiarly-formed bosses, each of which extends into the adjacent recess in the wheel $E^4$, and has three wings, $e$, which extend out nearly or quite to the periphery of the recess. The surfaces of these bosses between the wings are inclined or eccentric in opposite directions.

Short rollers $e'$ serve as clicks. They are inserted in each of the three spaces between the wings on the wheels E and E'. Each is acted on by a delicate spiral spring, $e^2$, (see Fig. 10,) so arranged that when the rack-bar $H^9$ is moving in one direction one of the wheels E E' engages with the feed-roller by pinching its rollers $e$, while the other wheel turns idly in the opposite direction. The engagement of one or the other of the wheels E E' with the wheel $E^4$ is effected by the pinching of the roller $e'$ in the wedge-like space between the eccentric surfaces of the boss and the inner concentric surfaces of the recess in the wheel $E^4$. On the reverse movement of the feed-bar $H^9$ the wheel E or E', which was before effective, becomes idle by virtue of the small rollers $e'$ being carried by the movement into a wider part of its wedge-shaped space, and the other wheel, E' or E, becomes effective and turns the feed-rollers $E^5$ $E^6$. The motion of the feed-bar $H^9$ is at this period in the opposite direction to the first, so the feed-rolls $E^5$ $E^6$ are turned in the same direction as before. It follows that the feed-rolls $E^5$ $E^6$ are thus turned in the same direction and with a practically continuous motion, the period of rest at the change of motion at the end of each movement of the feed-bar being very brief. The extent of the feed may be adjusted with great nicety by simply turning the screw $H^5$ in one direction or the other, and consequently increasing or diminishing the throw of the crank-pin $H^3$, and then turning the latter to set it tightly. The feed motion at the other end of the feed-bar (the left side in Fig. 1) is operated in the same extent; but the turning is effected in half the time. The other half of the time the paper is entirely at rest, the receipt of paper from the first feed being taken up by the descent of the drop-roll $E^{13}$. This intermittent second feed may be effected by mechanism similar to that of the first feed, simply omitting the wheel E' and giving the second feed-rolls $I^3$ twice the diameter of the first feed-roll, $E^6$. It would follow that the movement of the feed-bar to the left would induce a feed motion equal to the whole of that effected by both movements of the feed-bar in the first feed. Then the return movement of the feed-bar to the right would induce no motion of the second feed, and allow the required period of rest for the printing, cutting off, and packing. In practice I attain the end more simply by omitting the arms $H^6$ and parallel bar $H^7$ in the second feed mechanism, and producing the proper teeth on the upper surface of the feed-bar $H^9$, and engaging therewith the one wheel $H^{10}$, with its proper connection to one side of the wheel $H^8$, which is fixed on the shaft of the lower feed-roll. By reason of the large diameter of the latter this second feed mechanism gives at a single movement of the feed-bar in one direction the exact amount of feed required. Both feeds being actuated by the reciprocations of the same feed-bar $H^9$, it follows that the turning of the screw $H^5$ to adjust the motion of this feed-bar $H^9$ correspondingly adjusts both feeds.

$J^2$ is a stationary knife, extending squarely across the line of motion of the paper $m$.

$J^5$ is a movable knife, swinging in a vertical plane on a pivot, $j$, and adapted to act shearwise with the fixed knife $J^2$, and sever the paper whenever it is depressed.

J' is a lever turning on a center, $J^3$, engaged with the end of the moving knife $J^5$.

An arm, K, constituting practically the second arm of the lever J', is operated up and down by a rod, K', carrying a roller actuated by a cam, $K^2$, on the main shaft B. A momentary elevation of this rod K' at each revolution of the main shaft depresses the knife $J^5$ and severs the paper, thereby setting free one series or line of labels extending across the strip $m$.

The stationary knife $J^2$ and the hinged or movable knife $J^5$, as also the packing mechanism now to be described, are mounted on the same casting, $A^6$, which carries the slitting mechanism, and may be adjusted to the right or left, so as to act at the required distance from the printing, according as the sizes of the labels printed shall require.

O is the depressor, a broad open frame, extending across the path of the paper in close proximity to the shears $J^2$ $J^5$. Its lower face is thickly studded with short wires, analogous to the teeth of a card, having their ends ground smoothly. This frame O is held up by the springs O', coiled around the rods $O^2$, and is depressed at the proper moment by a quick movement, and allowed to return. This occurs at each elevation of the moving knife $J^5$. At each reciprocation the depressor presses on the upper faces of the series of labels which have been cut off, and forces them down upon the quantities similarly packed below. The open character of the frame O, and especially of the surface formed by the ends of the wires, allows a free circulation of air, so that the depressor may be raised again as rapidly as may be desired without any tendency to lift the labels.

The depressor receives its brief downward movement from the ascent of the knife $J^5$. This is effected through a lever, $J^8$, turning on a fixed center, $j'$, and provided with a beveled catch, $J^9$, at its end, which at the down movement of the knife $J^5$ yields inward, and is idle, but on the ascent of the knife $J^5$ engages therewith, or, rather, with a small clamp, $J^{10}$, fixed thereon, and is raised, thereby depressing the packer O. When this movement has proceeded to a certain extent the catch $J^9$ is by the circular motion of the lever $J^8$ disengaged from the knife, and the packer instantly rises by the force of the springs O', ready for the next series of labels. A continuance of the series of operations results in accumulating a constantly-increasing thickness of evenly-piled labels below. They rest on a platform, $O^3$, which is supported with gentle force by a spring, (not represented,) or by the friction of its bearings in a square chamber in which it is supported. I propose in most cases to depend on friction alone, the exterior of the platform being wound with leather, rubber, or other slightly-yielding material to induce a reliable friction. At intervals the evenly-arranged piles of labels are taken from this platform by an attendant, and the platform $O^3$ again raised to its highest position.

I have shown the platform $O^3$ as divided into several, and the space which receives the labels as correspondingly divided in several, isolated spaces; but this is not essential.

I¹⁰ and I¹⁰ are guide-fingers, curved as shown, and provided each with a clamping-screw, $i^2$, by which it can be set in any required position on the corresponding fixed frame-work. They are arranged to support the paper in an approximately plane condition as it passes through the rotary shears. The rotary shears and guide-fingers used therein will be made the subject of a separate application for patent.

It will now be seen that the machine draws the paper $m$ with a nearly-constant motion from the roll M. The drop-roll E¹³ takes up the slack which accumulates during the periods while the paper in its subsequent passage, though the machine is at rest. The feed-rolls I³ I⁵, worked intermittently, draw the paper forward step by step to an exactly determined extent, and then allow it to rest absolutely still for a sufficient period to allow the successive printings and the transverse cutting and packing. The first printing mechanism prints a portion of the impression and the second printing operation effects the remainder of the printing required. The slitting-cutters I⁶ I⁹ divide the strip of paper longitudinally into as many separate strips as the size and number of labels being printed require, the slits being always made along the spaces between the several labels, the paper being held in the proper plane by the fingers I¹⁰. The transverse shears J² J⁵ cut squarely across the entire series, this cut also being always made in the blank space between one label and the next. The packer strikes gently on the upper faces of the several labels and packs them down upon the piles previously finished. I have made the cutters the subject of a separate patent, and do not claim them here.

Z is a casing which supports bronzing mechanism to be applied when desired. The latter is driven by a small round belt carried by a grooved pulley, Z⁷, on the main shaft B. This round belt runs around idle-pulleys Z⁸ and a large pulley, Z⁹, which latter is pivoted on a stud, Z¹⁰, and is geared in its interior, as indicated in Fig. 16. The internal gearing of the pulley Z⁹ engages the several pinions of four rollers, Z⁵ Z⁵ Z⁶ Z⁶, which perform important functions.

Z′ is a bronzing-roller. It is covered with velvet or analogous material having a thick fine plush. The bronze is placed in a considerable space or trough, Z¹³, formed by two fixed plates, having an opening extending along the bottom in gentle contact with the surface of the roller Z′. The strip of paper is held in contact with the bronze-roller Z′ by means of a roller, Z², mounted below, subject to the action of springs $z$. Both rollers Z′ Z² turn easily on fine bearings, and the friction of the paper $m$ is sufficient to cause them to turn therewith. At each contact with the trough Z¹³ the plush on the surface of the roll Z′ becomes loaded with bronze, which is transferred to the upper surface of the paper. The paper passes from the bronze-roll Z′ over two yielding beds, Z³, which are urged gently upward by springs $z'$, of which there are two or more mounted side by side on a transverse shaft, Z⁴. Immediately over each of these tables is a roll, Z⁵, having a surface of woolen plush or analogous material adapted to press with just sufficient force on the freshly printed and bronzed paper moving below to pick up the surplus bronze and leave the paper with its impressions clearly bronzed, but with no appreciable waste.

Z⁶ and Z⁶ are brush wheels or rollers, covered with a brushing material composed of stiff bristles, fine wires, or the like, and having a surface motion quicker than that of the roller Z⁵. They brush the bronze from these rollers Z⁵ and recover it for subsequent use. Ordinarily the first roll Z⁵ and its brushing-roll Z⁶ will recover nearly all the bronze-powder and discharge it directly into the pile of bronze lying in the trough Z¹³; but if a portion of the bronze passes the first roll Z⁵ the second roll (similarly marked Z⁵) will lift it, and its brushing-roll Z⁶ will brush it into the middle trough, Z¹⁴. Z¹⁴ is a trough lying between the two rolls Z⁵ Z⁵, and serving to catch the bronze-powder which is thus removed from said rolls.

I employ a revolving table for distributing the ink and ordinary means for regulating the quantities applied. Such parts and others not fully described or represented in the drawings will be understood as being of any of the ordinary and approved constructions.

It will be understood that any of the ordinary or suitable appliances common to the printing business may be used as bearers to support the platen and even the impression. Strips of paper or other thin material should be extended across over the paper each side of the several forms to guide the paper and prevent its lifting by adhesion to the type.

I can use different-colored inks in the two printing mechanisms. Such will produce labels in two colors if the two impressions are arranged to be made on a portion of each label.

When labels all one color are required I can work twice as fast, printing the several labels in alternate positions on the paper and operating the transverse shears J² J⁵ twice instead of once for each revolution of the main shaft. This latter is effected by simply substituting the cam K³ (see Fig. 12ª) for the cam K′, (see Fig. 12,) which latter had been previously employed in making labels of two colors.

I have not deemed it necessary to introduce figures showing the paper in the half-printed condition induced by the first printing mechanism and in the fully-printed condition induced by the second printing mechanism. Such will not be needed by those familiar with printing work in two colors, but the printing, when only one color is worked in both presses, is peculiar in the fact that the cross-line labels, each complete in itself, are printed in alternate positions, so that the paper which has passed the first printing mechanism and has not yet reached the second exhibits complete lines of labels extending across the strip, alternating with corresponding blank spaces sufficient for the similar lines of labels which are to be printed therein by the second set of printing mechanism.

In printing with one color the feed must be adjusted to move the paper along the full width of one line of labels. In printing two colors, on the contrary, the feed must be adjusted so as to feed only to half the width of a line of labels. In the latter case the printing must be adjusted to make both impressions on the same labels, the types or other devices being arranged to produce the desired effect, as is well known in color-printing.

The difficulty of fully mastering the relations of the impressing mechanism to the feed mechanism and of both to the cutting mechanism justifies an elaborate rehearsal with diagrams of the working under both conditions. Both diagrams represent by capital letters the impressions of the printing mechanism on the left, and by corresponding lower-case letters the immediately succeeding impression by the printing mechanism on the right. In these diagrams it will be understood that the paper feeds toward the left, as shown in the figures. When both mechanisms are printing black each carries the complete form for a label, and the successive impressions are shown in diagram 1. They are applied in the following order: A a B b C c. Thus conditioned the cutting mechanism works after each impression. After making the impression C the cutting mechanism operates and cuts off a label which, although actually cut farther to the left, may be described as being the label C. After printing c the cutting mechanism again operates and cuts off a label—we will say the label b. Then, after printing D, the cutting mechanism operates and cuts off D. Then, after printing d, the cutting mechanism operates and cuts off c, and so on. When the machine is used to print two colors, both applied on the same labels, the printing mechanisms may be placed nearer together. The feeding operation comes in just as often as before, but only to half the width of the label at each operation, and the cutting is effected only after each alternate feed. Diagram 2 indicates the conditions for this manner of printing. The impressions follow in the same order as before, A a B b C c. If the labels are of the same size, the feed is only half the extent of the feed under the other conditions.

In practice the cutting off will be at a more advanced point in the progress of the strip of paper, but the action will be the same as if the cutting were close to the second printing, and I will so describe it.

In printing two colors, first we print B, then cut off a label, then we print b and do not cut. Then we print C and cut; then print c and do not cut; then D and cut, and so on. There is always a feed motion after each impression under both conditions.

When only one color is required, and the quantity of work to be done does not render it expedient to prepare two forms, only one printing-head need be used, and the single cam K' being introduced, the machine will work as before described, except that it will produce the labels only half as fast as it is capable of doing when both heads are worked.

It will be understood that the distances of the printing mechanisms apart may be increased and diminished; but care must be taken to make the distances always bear a certain relation to the dimensions of the forms. When printing in one color the presses are spaced the width of one label apart. When printing in two colors they are spaced half a label width apart, or one and a half, two and a half, or three and a half.

More than two sets of printing mechanism may be used. In such case more colors may be applied. There may be two printing simultaneously during one of the periods of rest, and two more printing simultaneously during the next period.

My experiments indicate a high degree of perfection in the resulting labels.

The construction shown in Figs. 18 and 19 provides for carrying the strip of paper up over a series of rollers and back under one of the forms of type, so as to present the opposite side of the paper to the impresssion. This allows for printing on both sides of the material, and is important in printing some kinds of tags and analogous work.

Further modifications may be made in many of the details. Parts of the invention may be used without the whole.

The bronzing apparatus is removed or disconnected, so as to be out of use when work is done which does not require it. If used in the position shown, it bronzes that part of the impression which has been done by the first printing mechanism, and the impressions produced by the second printing mechanism are not bronzed. The bronzing mechanism may be shifted to the other side of the second printing mechanism, so as to bronze the whole when it is desired to make the labels with both impressions bronzed. Size instead of ink will ordinarily be used for the bronzed work.

The slitting-knives are adjusted so as to remove a portion at both edges of the strip of paper, which edge-strips will be wasted. I conduct the waste-strips up over the upper knife, so that this waste material is discharged in the form of long uncut strips.

I do not here claim the specific construction of the mechanism for cutting paper longitudinally, nor the means for adjusting such cutting, nor the means for supporting the paper in a plane condition for such cutting, those features being made the subject of a separate application for patent.

I claim as an improvement in machines for producing labels and analogous work—

1. The levers G, carrying suitable inking-rolls and springs, as shown, and mounted on a center, $G^9$, below the upper bearing of the toggle-lever $F^3$ $F^7$, in combination with the bed or platen F, toggle-lever $F^4$, and a connection, $G^7$, adapted to communicate the motion, substantially as and for the purposes herein specified.

2. One or more printing mechanisms, in combination with continuously-acting feed-rollers receiving the paper uniformly, and with intermittently-acting feed-rollers, and with provisions $E^{13}$ for taking up the slack, and with a single adjusting device, $H^9$, connected to the train of mechanism impelling both sets of feed-rolls so that one adjustment suffices for both, as herein specified.

3. The depressor O, provided with wires or teeth arranged at right angles to its surface, as described, and mechanism for depressing it after each operation of the knife $J^5$, in combination with such knife and with mechanism, substantially as described, for feeding and printing the labels, as herein specified.

In testimony whereof I have hereunto set my hand, at Providence, Rhode Island, this 19th day of September, 1881, in the presence of two subscribing witnesses.

THOMAS A. BRIGGS.

Witnesses:
  JOSEPH S. G. COBB,
  JOB BOOTH.